United States Patent
Vo et al.

(10) Patent No.: US 9,932,480 B2
(45) Date of Patent: Apr. 3, 2018

(54) PEG-ASSISTED DEPOSITION OF CRACK-FREE TITANIA NANOCRYSTALLINE COATINGS OVER AL FLAKES

(71) Applicants: Toyota Motor Engineering & Manufacturing North America, Inc., Erlanger, KY (US); Toyota Jidosha Kabushiki Kaisha, Toyota-shi, Aichi-ken (JP)

(72) Inventors: Khoa Vo, Ypsilanti, MI (US); Songtao Wu, Ann Arbor, MI (US); Debasish Banerjee, Ann Arbor, MI (US); Masahiko Ishii, Okazaki (JP)

(73) Assignees: Toyota Motor Engineering & Manufacturing North America, Inc., Erlanger, KY (US); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/323,308

(22) Filed: Jul. 3, 2014

(65) Prior Publication Data
US 2016/0002432 A1    Jan. 7, 2016

(51) Int. Cl.
*C09C 1/00* (2006.01)
*C09C 1/64* (2006.01)
*C08K 9/02* (2006.01)

(52) U.S. Cl.
CPC ............ *C09C 1/0021* (2013.01); *C09C 1/642* (2013.01); *C08K 9/02* (2013.01); *C09C 2200/1054* (2013.01); *C09C 2200/1058* (2013.01); *C09C 2200/302* (2013.01); *C09C 2200/304* (2013.01)

(58) Field of Classification Search
CPC ......... C09C 1/36; C09C 1/3607; C09C 1/363; C09C 1/3661; C09C 1/62; C09C 1/64; C09C 1/642; C09C 1/0015; C09C 2200/1054; C09C 2200/302
See application file for complete search history.

(56) References Cited

U.S. PATENT DOCUMENTS

| | | | |
|---|---|---|---|
| 6,569,529 B1 * | 5/2003 | Phillips | C09C 1/0015 106/403 |
| 6,586,098 B1 | 7/2003 | Coulter et al. | |
| 7,060,126 B2 | 6/2006 | Andes et al. | |
| 7,291,216 B2 | 11/2007 | Bujard | |
| 7,419,538 B2 | 9/2008 | Li et al. | |
| 7,943,194 B2 | 5/2011 | Bujard et al. | |
| 2009/0148605 A1 * | 6/2009 | Akhtar et al. | 427/299 |
| 2012/0237851 A1 * | 9/2012 | Zhang et al. | 429/494 |
| 2013/0035400 A1 | 2/2013 | Nguyen et al. | |

OTHER PUBLICATIONS

Li Zhou et al., Characterization of flaky aluminum pigments multi-coated by TiO2 and SiO2.
Marie Mahe et al., "Cracking of titania nanocrystalline coatings", Merck KGaA / ICMCB / Technische Universität Darmstadt (2008).
Weixin Huang et al, "Effect of polyethylene glycol on hydrophilic TiO2 films: Porosity-driven superhydrophilicity", Surface & Coatings Technology 204 (2010) pp. 3954-3961, Elsevier B.V.
Yu-Chang Liu et al., "Nanostructured Mesoporous Titanium Dioxide Thin Film Prepared by Sol-Gel Method for Dye-Sensitized Solar Cell", International Journal of Photoenergy, vol. 2011, Article ID 619069 (9 pages), Hindawi Publishing Corporation.
Virpi Ääritalo et al., "Development of a Low Temperature Sol-Gel-Derived Titania-Silica Implant Coating", Materials Sciences and Applications, 2010, 1, pp. 118-126, Scientific Research.

* cited by examiner

*Primary Examiner* — Pegah Parvini
(74) *Attorney, Agent, or Firm* — Dinsmore & Shohl LLP

(57) ABSTRACT

A process of forming a multi-layered pigment includes the steps of: providing a metal core material; dispersing the metal core material in a first solvent and organic binder mixture; depositing a high refractive index material onto the metal core material; drying the deposited high refractive index and metal core material wherein the high refractive index layer is uniform and crack-free.

12 Claims, 14 Drawing Sheets

Without PEG

With PEG

US 9,932,480 B2

PEG-ASSISTED DEPOSITION OF CRACK-FREE TITANIA NANOCRYSTALLINE COATINGS OVER AL FLAKES

FIELD OF THE INVENTION

The invention relates to processes for forming pigments having metal cores and a uniform smooth crack-free layer of a high refractive index material and materials formed by the process.

BACKGROUND OF THE INVENTION

Generally, luster and interference pigments are known in the art for use in various applications such as automotive finishes, coatings and other pigment applications.

Such pigments may be formed by deposition of titanium oxide over highly reflective platelet-like aluminum flakes in a water system. $TiO_2$ may be deposited to the Al flake under highly acidic conditions such as at a pH of less than 2.0 such that a hydrolysis reaction for $TiO_2$ may be achieved. However, such a process results in unsatisfactory coatings due to the diffusion of aqueous solution through the $SiO_2$ layer.

Problems associated with the above deposition include both etching of the Al core and a change in pH near the $SiO_2$—Al surface which are undesired for $TiO_2$ deposition. At such low pH, the protons in the aqueous solution can still diffuse through the $SiO_2$ layer and react with the Al core during the typical long deposition period. This side reaction between the proton and Al as well as the resultant pH increase at the core surface renders the deposition of $TiO_2$ difficult. Diffusion of protons through the $SiO_2$ layer may cause a reaction with Al such that hydrogen gas is released causing weak adhesion of the $TiO_2$ particles and the formation of channels or cracks in the $SiO_2$ and $TiO_2$ layers. Additionally, an increase in the pH may cause rapid deposition of the $TiO_2$ layer and formation of large particles of $TiO_2$ which would adversely affect the pigment's properties.

Additionally, problems associated with using a sol-gel process includes the formation of cracks and other imperfections for high refractive index layers that are greater than 120 nm. There is therefore a need in the art for an improved process and pigment that solves the problems identified above and produces a pigment that has a crack-free and uniform high refractive index or $TiO_2$ layer. There is also a need in the art for a an improved process and pigment that includes high refractive index layers that have a thickness of greater than 120 nm and is crack-free and uniform.

SUMMARY OF THE INVENTION

In one aspect there is disclosed, a process of forming a multi-layered pigment includes the steps of: providing a metal core material; dispersing the metal core material in a first solvent and organic binder mixture; depositing a high refractive index material onto the metal core material; drying the deposited high refractive index and metal core material wherein the high refractive index layer is uniform and crack-free.

In another aspect there is disclosed, a multi-layered pigment that includes a metal core. A high refractive index layer is applied by an aqueous organic two-phase process to and surrounding the metal core. The high refractive index layer has a thickness greater than 120 nm wherein the high refractive index layer is uniform and crack-free.

In a further aspect there is disclosed, a multi-layered pigment that includes an Al—$SiO_2$ core. A $TiO_2$ layer is applied by an aqueous organic two-phase process to and surrounding the Al—$SiO_2$ core. The $TiO_2$ layer has a thickness greater than 120 nm wherein the $TiO_2$ layer is uniform and crack-free.

DETAILED DESCRIPTION OF THE PREFERRED EMBODIMENTS

Figure 1A:
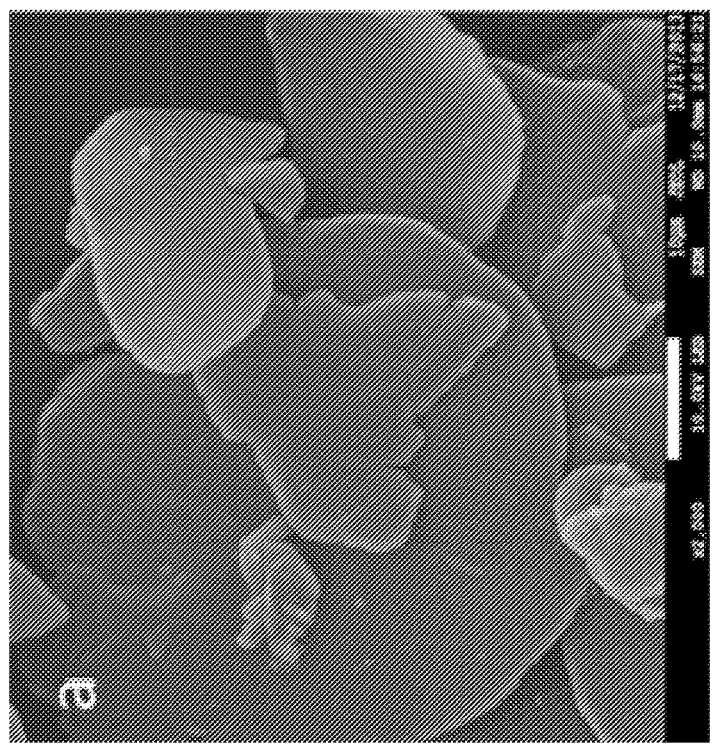
FIG. 1A is an SEM image of a coated particle having a $TiO_2$ coating without the addition of an organic binder.

There is disclosed a process of forming a multi-layered pigment and a multi layered pigment that has a uniform surface coating for use in high chroma and other pigment systems. The process provides a low cost process using a two-phase system to produce pigments in an economical manner. The multi-layered pigment includes a uniform coating of a high refractive index material that does not include cracks or other imperfections.

The process of the present invention allows for an economical procedure to produce pigments having varying thicknesses of high refractive layers of thicknesses up to 200 nm. The process eliminates side reactions and processing problems in prior art applications. The process solves the problems of both etching of the Al core and a change in pH near the $SiO_2$—Al surface which are undesired for $TiO_2$ deposition. The process eliminates cracks and other imperfections in a high refractive index layer for various thicknesses.

The process of forming a multi layered pigment includes the steps of: providing a metal core material; dispersing the metal core material in a first solvent and organic binder mixture; depositing a high refractive index material onto the metal core material; drying the deposited high refractive index and metal core material wherein the high refractive index layer is uniform and crack-free.

The metal core material may include various metals including Al, Cr and coated Al such as Al coated with a layer of $SiO_2$. In one aspect, the high refractive index layer includes $TiO_2$. Additional high refractive index materials may include $Fe_2O_4$, $Cr_2O_3$, and $Fe_3O_4$. The high refractive index layer may have a thickness of from 50-200 nm. In another aspect the high refractive index layer may have a thickness greater than 120 nm.

The step of dispersing the metal core material may include suspending the metal core material in a solution of a first solvent such as ethanol and an organic binder. The organic binder may include anionic, cationic, zwitterionic and non-ionic binders. Various examples of binders include: ammonium lauryl sulfate, sodium lauryl sulfate, sodium dodecyl sulfate (SDS), sodium lauryl ether sulfate (SLES), sodium lauroyl sarcosinate cetyl trimethylammonium bromide (CTAB), hexadecyl trimethyl ammonium bromide, cetyl trimethylammonium chloride (CTAC), Cocamidopropyl betaine, Polyethylene glycol; Polyoxypropylene glycol alkyl ethers; Polyoxyethylene glycol, alkylphenol ethers (Triton X-100); Polyoxyethylene glycol sorbitan alkyl esters; Block copolymers of polyethylene glycol and polypropylene glycol; Glycerol alkyl esters; and Glucoside alkyl ethers. In one aspect, the organic binder is present in an amount of from 0.5% to 10% by weight in relation to the core metal particle and first solvent.

The step of depositing a high refractive index material onto the metal core material may include dissolving a high refractive material precursor in a second solvent and adding the dissolved metal precursor and water to the dispersed core material in the first solvent and organic binder mixture. The second solvent may include ethanol. In one aspect water may be added to the mixture at the same time as the dissolved metal precursor with another subsequent amount of water added following addition of the dissolved metal precursor. The metal precursor may include tetraethyl orthotitanate (TEOT) or other metal compounds that dissolve in an organic solvent. The resulting particles may then be washed with a solvent and filtered and then dried at room temperature for a specified period of time such as for example 24 hours. The resulting dried particles have a layer of high refractive index material deposited thereon and the layer is uniform and crack-free.

Following the step of dying, the particles may be sintered removing the organic binder. In one aspect, the particles may be sintered at a temperature of less than or equal to 400° C. for a specified time. The resulting sintered particles have a layer of high refractive index material deposited thereon and the layer is uniform and crack-free.

In another aspect, there is disclosed a multi-layered pigment that includes a metal core. A high refractive index layer is applied to and surrounds the passivation layer wherein the high refractive index layer is uniform and crack-free. The high refractive index layer may have a thickness of from 50-200 nm. In another aspect the high refractive index layer may have a thickness greater than 120 nm.

In one aspect the metal core material may include an Al—$SiO_2$ core and the high refractive index material may include a $TiO_2$ layer applied by an aqueous organic two-phase process to and surrounding the Al—$SiO_2$ core. The $TiO_2$ layer having a thickness greater than 120 nm wherein the $TiO_2$ layer is uniform and crack-free.

EXAMPLES

Materials

Aluminum flakes were obtained from Silberline Manufacturing Co coated with a thin $SiO_2$ layer. Titanium (IV) ethoxide, polyethylene glycol (PEG, average molecular weight 1000 Da), and ethanol (99%) were purchased from Sigma-Aldrich Chemical Co. (St. Louis, Mo.). Unless mentioned, all reagents and solvents used in the experiments were of the highest grade commercially available.

Deposition of Crack-Free Titania Nanocrystalline Coatings Over Al Flakes 0-2.7 g of PEG is dissolved in 50 ml of absolute ethanol. 5 g of $SiO_2$-coated Aluminum flakes having particle sizes of 20-50 μm and an average thickness of 300 nm are suspended in 50 ml of absolute ethanol containing PEG in a 250 ml round bottom flask and heated to 40° C. while constantly stirring. 2.5 g of titanium (IV) ethoxide (TEOT) is dissolved in 50 ml of absolute ethanol and heated to 40° C. This solution is then metered into the aluminum flake suspension while vigorously stirring. At the same time, 1.8 ml of deionized (DI) water is metered in. A further 4.7 ml of DI water is subsequently metered in. The mixture is allowed to cool to room temperature in about 1 hour, and the resultant intermediate is filtered off, washed with ethanol, and air-dried at room temperature for 24 hours. The coated material is then sintered at 400° C. for 2 hours.

Figure 1B:
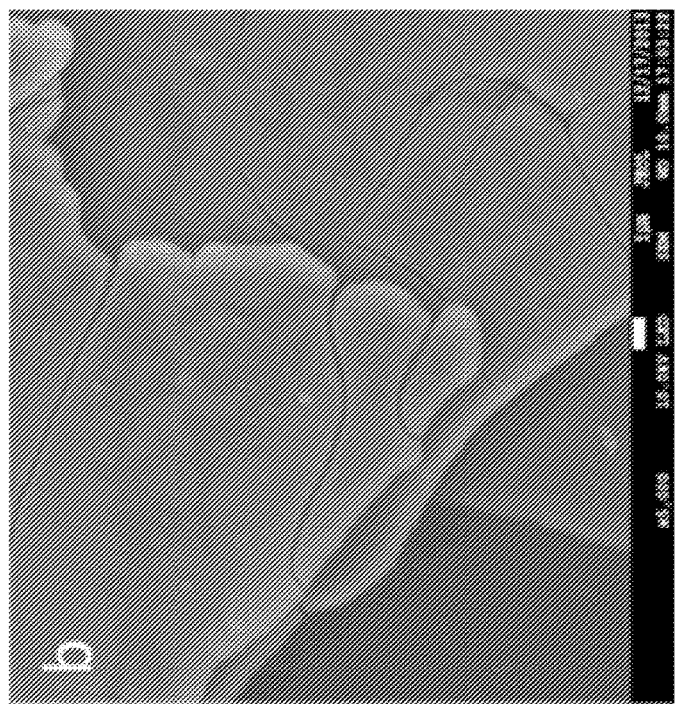
FIG. 1B is an SEM image of a coated particle having a $TiO_2$ coating without the addition of an organic binder.
Figure 1C:
FIG. 1C is an SEM image of a coated particle having a $TiO_2$ coating without the addition of an organic binder.
Figure 1D:
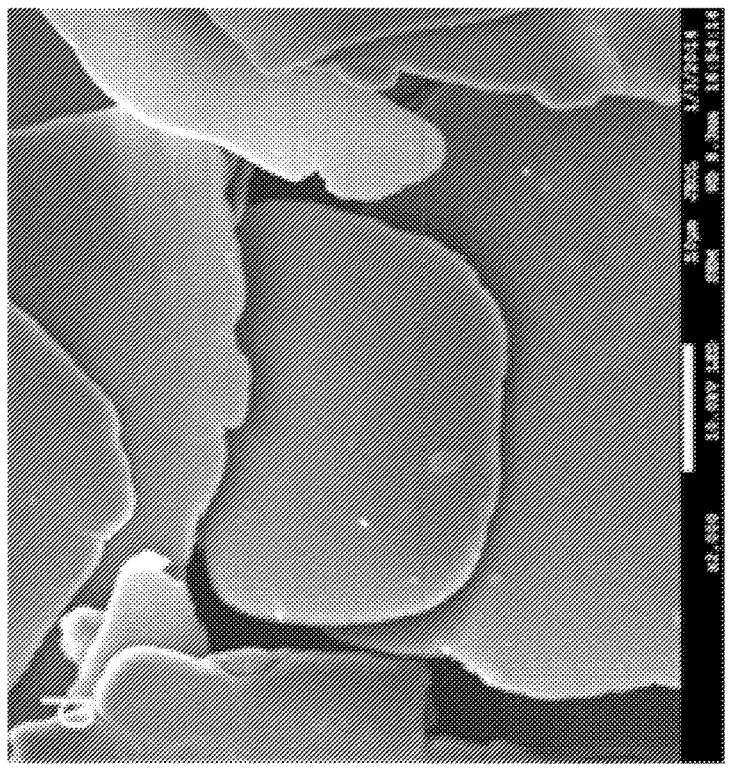
FIG. 1D is an SEM image of a coated particle having a $TiO_2$ coating with the addition of an organic binder.
Figure 1E:
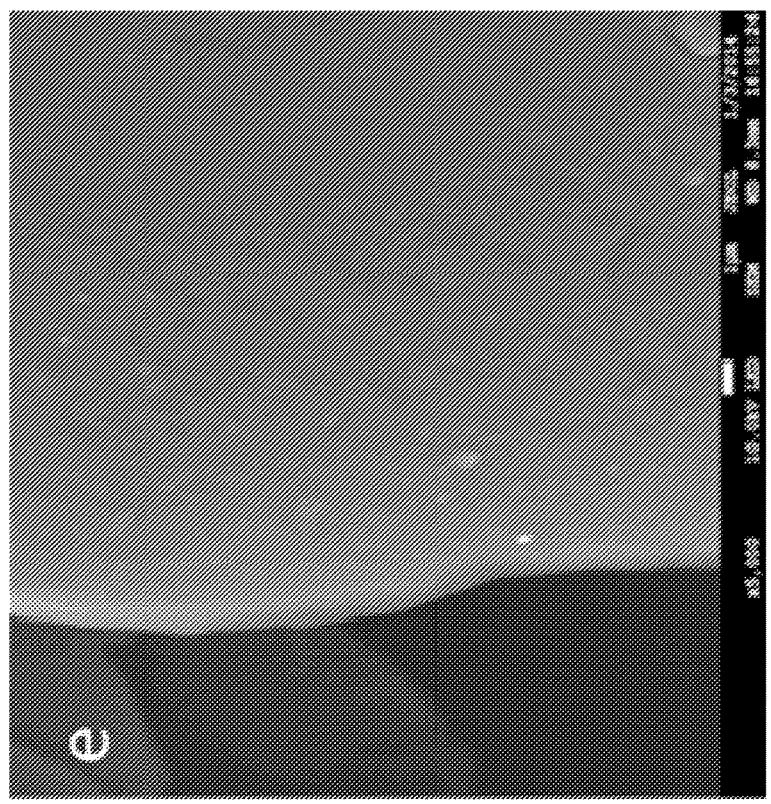
FIG. 1E is an SEM image of a coated particle having a $TiO_2$ coating with the addition of an organic binder.
Figure 1F:
FIG. 1F is an SEM image of a coated particle having a $TiO_2$ coating with the addition of an organic binder.

A process for producing multilayer pigment particles should be stable and produce uniform crack-free particles. Referring to FIG. 1, SEM images of samples before sintering for a coated particle having a $TiO_2$ coating with and without the addition of an organic binder. FIGS. 1a-c show crack formation in $TiO_2$ layer over an aluminum flake having a layer of $SiO_2$ when no PEG was added. FIGS. 1d-f shows the smooth crack-free $TiO_2$ layer over aluminum flake with the addition of 3 weight % of PEG. The thicknesses of $TiO_2$ layers with and without PEG are measured as the same thickness of 155±10 nm as shown in FIGS. 1c and 1f.

Figure 2A:
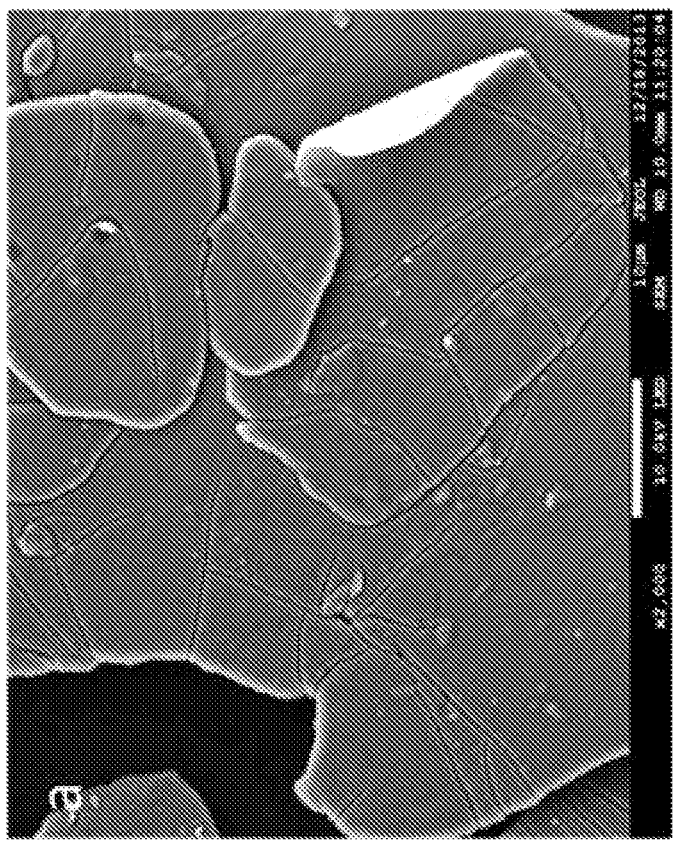
FIG. 2A is an SEM image of a coated particle having a $TiO_2$ coating without the addition of an organic binder following sintering.
Figure 2B:
FIG. 2B is an SEM image of a coated particle having a $TiO_2$ coating without the addition of an organic binder following sintering.
Figure 2C:
FIG. 2C is an SEM image of a coated particle having a $TiO_2$ coating with the addition of an organic binder following sintering.
Figure 2D:
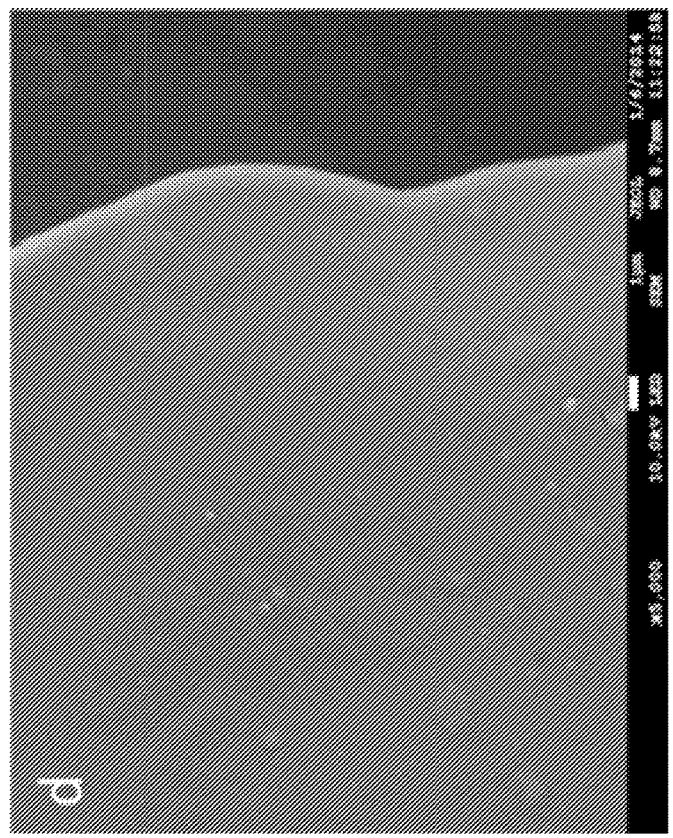
FIG. 2D is an SEM image of a coated particle having a $TiO_2$ coating with the addition of an organic binder following sintering.

Referring to FIGS. 2a-d SEM images of samples following sintering for a coated particle having a $TiO_2$ coating with and without the addition of an organic binder are shown. As shown in FIGS. 2a-b there are cracks of the $TiO_2$ layer without addition of PEG which become larger after calcination in comparison to the cracks present in FIGS. 1a-c. Referring to FIGS. 2c-d no cracks are present in the $TiO_2$ layer when PEG was added.

The results in FIG. 2 clearly demonstrated the improvement in the high refractive index layer at thicknesses that exceed 120 nm. The addition of the organic binder results in uniform $TiO_2$ layer deposition over the $SiO_2$—Al surface with no cracks or defects.

Figure 3A:
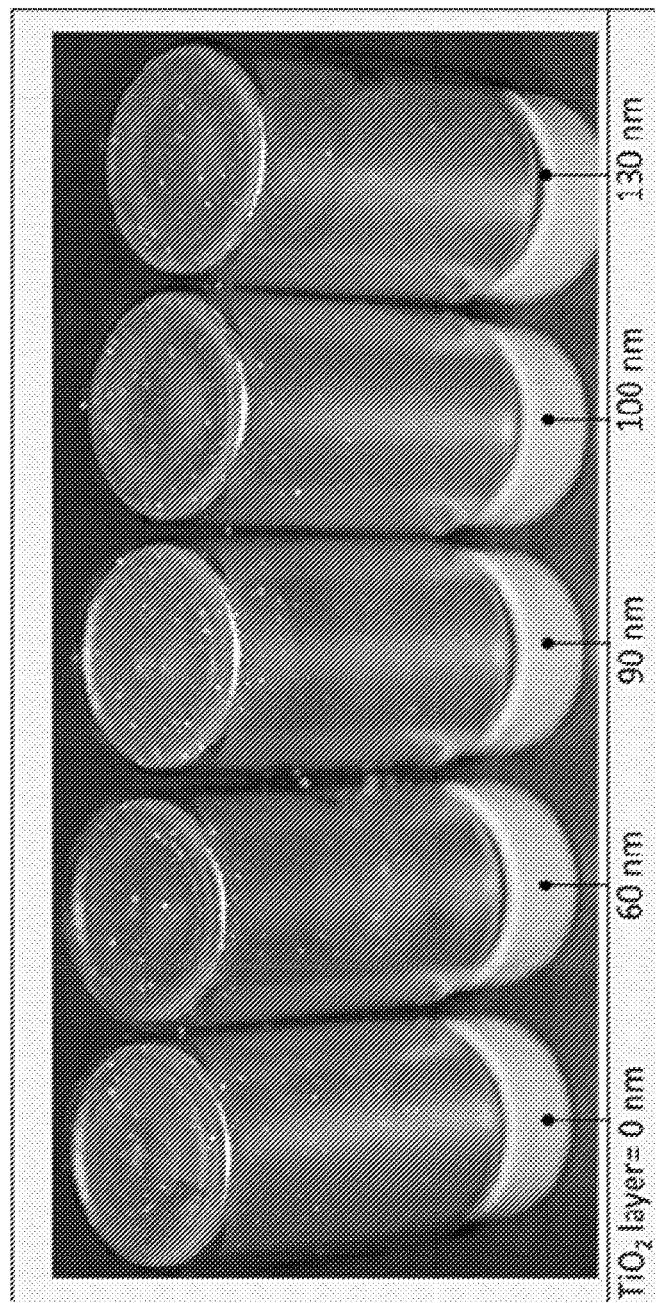
FIG. 3A are SEM images of $TiO_2$ layers of varying thickness over an Al core.

The relationship between the amount of the high refractive index precursor TEOT and the $TiO_2$ layer thickness was also investigated. FIG. 3a shows the image of four $TiO_2$—Al pigment samples synthesized with an increased amount of TEOT from $2^{nd}$ left to right. The Al flakes coated with a thin layer of $SiO_2$ (~15 nm) was placed on the $1^{st}$ left for comparison. Visibly all samples showed uniform colors which indicates a consistent thickness of the $TiO_2$ layer on the particles. The color gradually shifts from original silver to purple, blue, green and gold as the thickness of the $TiO_2$ layer increases.

Figure 3B:
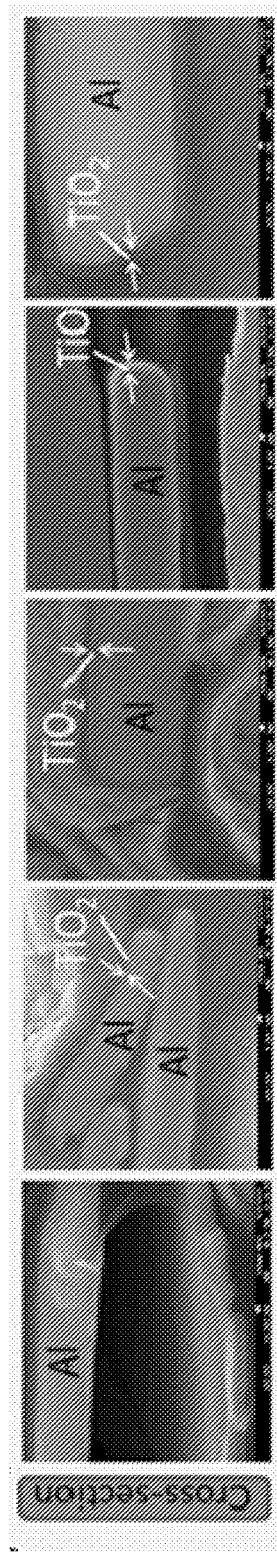
FIG. 3B are SEM images of FIG. 3A in cross section.

To analyze quantitatively the $TiO_2$ layer thickness as well as to assess such color shift, FE-SEM characterization of the pigment cross-section was performed as shown in FIG. 3b. The cross sectional SEM images confirm the application of a smooth $TiO_2$ layer deposited over the Al core flakes.

Figure 3C:
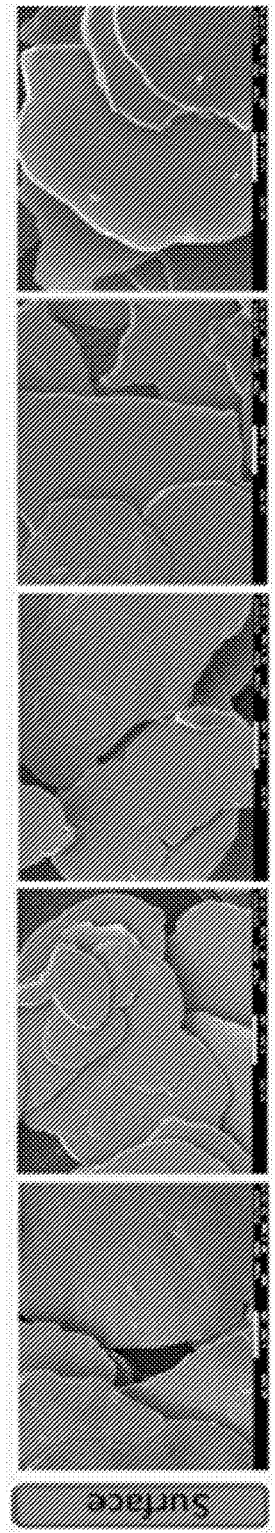
FIG. 3C are SEM images of FIG. 3A of the surface.
Figure 4:
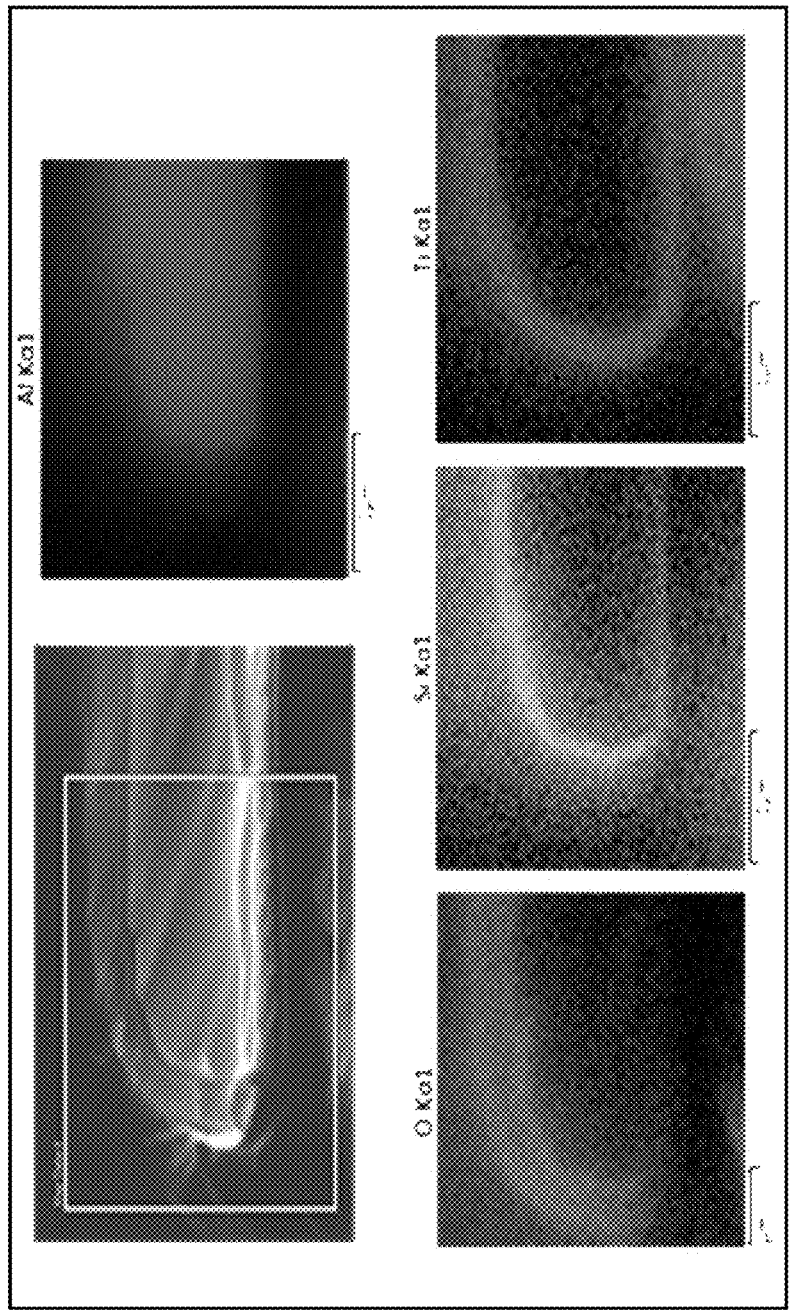
FIG. 4 is an EDX image of a pigment having a $TiO_2$ layer 160 nm thick.

The increase in the thickness of $TiO_2$ layer from 0 to 120 nm is proportional to the amount of precursor added. SEM images of the top surface as shown in FIG. 3c further reveal the smooth surface of $TiO_2$ layer for all of the pigment samples. By using energy-dispersive X-ray microanalysis (EDX), the uniform $TiO_2$ layer formation over the $SiO_2$-coated Al cores is confirmed with a thickness of 160 nm as shown in FIG. 4.

The ability to have various thicknesses of high refractive index layer including layers that are greater than 120 nm and are uniform and crack-free is an improvement of the prior art. Pigments of various thicknesses may be utilized in structural, luster or interference paint applications and will allow for additional color and optical properties that are not capable using prior art pigments.

The above examples and embodiments are for illustrative purposes only and changes, modifications, and the like will be apparent to those skilled in the art and yet still fall within the scope of the invention. As such, the scope of the invention is defined by the claims.

We claim:

1. A process of forming a multi-layered pigment comprising the steps of:
   providing a metal core material wherein the metal core material is Al coated with SiO2;
   dispersing the metal core material in a first solvent and organic binder mixture wherein the organic binder is present in an amount of from 0.5% to 10% by weight in relation to the core metal particle and first solvent;
   depositing a high refractive index material onto the metal core material;
   drying the deposited high refractive index and metal core material;
   wherein the high refractive index layer has a thickness of from 50-200 nm and the high refractive index layer is uniform and crack-free.

2. The process of forming the multi-layered pigment of claim 1 wherein the high refractive index layer includes $TiO_2$.

3. The process of forming the multi-layered pigment of claim 1 wherein the first solvent includes ethanol.

4. The process of forming the multi-layered pigment of claim 1 wherein the organic binder is selected from the group consisting of: anionic, cationic, zwitterionic and non-ionic binders.

5. The process of forming the multi-layered pigment of claim 1 wherein the organic binder is selected from the group consisting of: ammonium lauryl sulfate, sodium lauryl sulfate, sodium dodecyl sulfate (SDS), sodium lauryl ether sulfate (SLES), sodium lauroyl sarcosinate cetyl trimethyl-ammonium bromide (CTAB), hexadecyl trimethyl ammonium bromide, cetyl trimethylammonium chloride (CTAC), Cocamidopropyl betaine, Polyethylene glycol; Polyoxypropylene glycol alkyl ethers; Polyoxyethylene glycol, alkylphenol ethers (Triton X-100); Polyoxyethylene glycol sorbitan alkyl esters; Block copolymers of polyethylene glycol and polypropylene glycol; Glycerol alkyl esters; Glucoside alkyl ethers.

6. The process of forming the multi-layered pigment of claim 1 wherein the high refractive precursor includes tetraethyl orthotitanate (TEOT).

7. The process of forming the multi-layered pigment of claim 1 wherein the depositing step includes dissolving a high refractive material precursor in a second solvent and adding the dissolved metal precursor and water to the dispersed core material in the first solvent and organic binder mixture.

8. The process of forming the multi-layered pigment of claim 7 wherein the second solvent includes ethanol.

9. The process of forming the multi-layered pigment of claim 1 further including the step of sintering the material after the drying step removing the organic binder.

10. The process of forming the multi-layered pigment of claim 9 wherein the sintering step is at a temperature of less than or equal to 400° C. for a specified time.

11. The process of forming the multi-layered pigment of claim 1 wherein the step of depositing further includes the step of washing and filtering the metal core material.

12. A process of forming a multi-layered pigment comprising the steps of:
    providing a metal core material wherein the metal core material is Al coated with SiO2;
    dispersing the metal core material in a first solvent and organic binder mixture wherein the organic binder is present in an amount of from 0.5% to 10% by weight in relation to the core metal particle and first solvent;
    depositing a high refractive index material onto the metal core material;
    drying the deposited high refractive index and metal core material;
    wherein the high refractive index layer has a thickness of greater than 120 nm and the high refractive index layer is uniform and crack-free.

* * * * *